(12) United States Patent
Lavery

(10) Patent No.: US 10,511,926 B2
(45) Date of Patent: Dec. 17, 2019

(54) SELF-LOCALIZATION AND SELF-ORIENTATION OF A CEILING-MOUNTED DEVICE

(71) Applicant: Symbol Technologies, Inc., Schaumburg, IL (US)

(72) Inventor: Richard J. Lavery, Huntington, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 1005 days.

(21) Appl. No.: 13/895,481

(22) Filed: May 16, 2013

(65) Prior Publication Data

US 2013/0250101 A1 Sep. 26, 2013

(51) Int. Cl.

| | | |
|---|---|---|
| *G01B 11/14* | (2006.01) | |
| *H04S 5/00* | (2006.01) | |
| *G10L 25/78* | (2013.01) | |
| *H04N 5/60* | (2006.01) | |
| *H04N 21/439* | (2011.01) | |
| *H04N 21/845* | (2011.01) | |

(52) U.S. Cl.
CPC ............... *H04S 5/00* (2013.01); *G01B 11/14* (2013.01); *G10L 25/78* (2013.01); *H04N 5/60* (2013.01); *H04N 21/4394* (2013.01); *H04N 21/4398* (2013.01); *H04N 21/8456* (2013.01)

(58) Field of Classification Search
CPC ...................................................... G01B 11/14
See application file for complete search history.

(56) References Cited

U.S. PATENT DOCUMENTS

| | | | |
|---|---|---|---|
| 6,360,446 B1 * | 3/2002 | Bijawat ................ | G01C 15/008 33/286 |
| 6,583,869 B1 * | 6/2003 | Sheridan ................. | G01S 17/87 356/153 |
| 7,022,962 B2 | 4/2006 | Ohtomo et al. | |
| 7,334,341 B2 * | 2/2008 | Donaldson ........... | G01B 21/047 33/286 |
| 7,467,474 B1 * | 12/2008 | Statham ............... | G01B 11/272 33/286 |
| 7,492,448 B2 | 2/2009 | Blair | |
| 7,679,727 B2 | 3/2010 | Benz et al. | |
| 7,742,840 B2 | 6/2010 | Watanabe et al. | |
| 7,797,845 B2 * | 9/2010 | Durham ............... | G01C 15/004 33/290 |
| 8,024,072 B2 | 9/2011 | Park et al. | |
| 8,196,835 B2 | 6/2012 | Emanuel et al. | |
| 8,922,647 B2 * | 12/2014 | Crothers .............. | G01B 21/045 348/135 |

(Continued)

*Primary Examiner* — Tri T Ton
*Assistant Examiner* — Rufus L Phillips
(74) *Attorney, Agent, or Firm* — Yuri Astvatsaturov

(57) ABSTRACT

A device and method for self-localization of a ceiling-mounted device within an indoor environment includes establishing a floor plan of the environment including a plurality of fixed reference indicia having known locations with respect to an origin point of the environment. A plumb light beam is projecting downward from the device to a floor of the environment to produce a projection on the floor. An imaging of the floor including the projection and at least two reference indicia is captured. A location of the device can then be determined with respect to the origin using the projection and at least two reference indicia.

10 Claims, 5 Drawing Sheets

(56) References Cited

U.S. PATENT DOCUMENTS

| | | | |
|---|---|---|---|
| 8,943,701 B2* | 2/2015 | Hayes | G01C 15/002 |
| | | | 33/1 G |
| 2004/0233461 A1 | 11/2004 | Armstrong et al. | |
| 2006/0177101 A1 | 8/2006 | Kato et al. | |
| 2006/0283029 A1* | 12/2006 | Jan | G01C 15/002 |
| | | | 33/286 |
| 2007/0204474 A1* | 9/2007 | Lin | G01C 15/002 |
| | | | 33/286 |
| 2010/0150070 A1 | 6/2010 | Park et al. | |
| 2011/0097014 A1 | 4/2011 | Lin | |
| 2011/0205340 A1 | 8/2011 | Garcia et al. | |
| 2011/0210843 A1* | 9/2011 | Kummetz | G01S 5/0289 |
| | | | 340/517 |
| 2011/0310255 A1 | 12/2011 | Medeiros et al. | |
| 2014/0268064 A1* | 9/2014 | Kahle | G01B 11/14 |
| | | | 353/28 |

* cited by examiner

SELF-LOCALIZATION AND SELF-ORIENTATION OF A CEILING-MOUNTED DEVICE

BACKGROUND

The installation of devices within an indoor environment can require that the location and orientation of the installed devices are known. For example, the installation of wireless access points or other types of communication systems in a retail environment should be known in order to provide the most efficient communication coverage. This can be accomplished by either precisely locating and orienting the devices according to a known plan, or by taking precise manual measurements after the devices have been installed. Both is these techniques are difficult to accomplish.

Further, in order to maximize communication coverage in a large indoor space, ceiling mounted transceivers are most effective. However, these are the most difficult to install accurately. In addition to the need to know the location of these devices, some systems may also require knowledge of the azimuth orientation or the device. The logistics of installing such a system make it very difficult to have the installers place the transceivers in very precise known locations and orientations that are carefully measured and recorded. This would be a very labor intensive process that would add time, cost, and the increased likelihood of human error to the installation of such a system.

Accordingly, there is a need for a technique to provide precise and accurate locations and orientations of devices installed within an indoor environment. It would also be beneficial if this technique could be performed quickly, within minimum error, and at a low cost.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
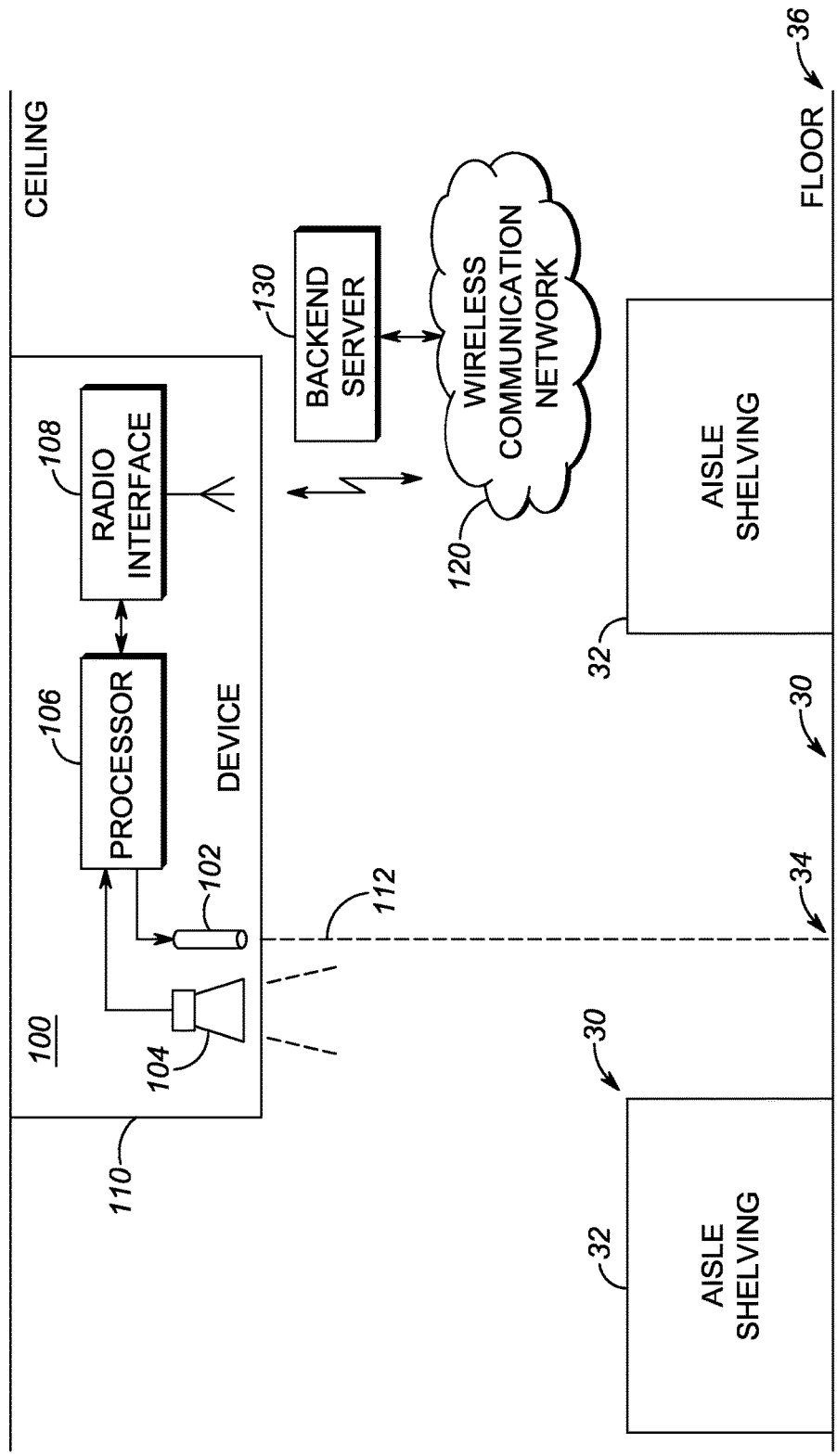
FIG. 1 is a simplified side-view diagram of a self-locating, self-orienting device within an indoor environment, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to provide precise and accurate locations and orientations of ceiling mounted devices installed within an indoor environment. The present invention accomplishes this quickly, within minimum error, and at a low cost. In practice, precise locations and orientations can be used by the devices to provide more accurate reference locationing for mobile devices moving within the environment.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, switches, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a diagram of a system and ceiling-mounted device operable for self-localization within an indoor environment, in accordance with the present invention. The indoor environment can be a building enclosing a retail store, warehouse, school, workplace, or other public of private environment. One or more devices 100 can be implemented within the environment. Typically, these devices can provide any type of communication services where the precise location of the device must be known. For example, the device 100 can be used to locate other mobile devices moving within the environment. In order to locate these other mobile devices the exact position (and possibly the orientation) of the locating device 100 must first be determined. To provide an unobstructed communication path to these other mobile devices, it is preferred that the locating devices 100 be ceiling-mounted within the environment.

The environment is mapped with a floor plan or other type of planogram where all the fixtures are mapped. The floor plan includes an origin point 36, to which the locations of all the devices are referenced. The floor plan includes the location and orientation of fixed reference indicia 30 having known and recognizable location and orientations. Indicia as defined herein are two pieces of information that provide a known location and a scale. The reference indicia can include recognizable marks on the floor, recognizable points on fixtures such as aisle shelving, floor tiles, distinguishing marks, or any other points, lines, or marks that are noted as recognizable reference indicia on the floor plan. For example, an "X" mark on the floor and having a known size can provide the two pieces of indicia information, the cross hairs of the "X" defining a point of known location as the first indicia, and the size of the cross hairs themselves providing the scale as the second indicia.

Each device 100 can include a housing 110 that encapsulates the device 100 and is disposed on a ceiling within the environment. The housing 110 includes an installed light source 102 (e.g. laser), an imaging device 104 (e.g. camera), and a processor 106 coupled to the light source and imaging device. A memory holds the floor plan with the reference indicia. The memory can be part of the processor 106 or can be located in a backend server 130 under control of an administrator. The processor can download the floor plan from the server into its memory or access the floor plan using a radio interface 108 that can communicate with the memory in the server 130 using a wired interface connection (not shown), such as an Ethernet interface connection, or using wireless network connection 120 that can include local and wide-area wireless networks, Bluetooth®, or IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

It should be recognized that other components, including controllers, digital signal processors, image analyzers, interferometry components, optical devices, power sources, amplifiers, signal converters, filters, and the like, are not shown for the sake of simplicity of the drawings.

The processor 106 is operable to control and direct the light source 102 (e.g. laser) to project a light beam 112 downward from the device to a floor of the environment to produce a projection 34 on the floor. Preferably, the laser device includes a self-leveling mechanism such that the light beam from the laser is plumb with the floor, i.e. it is vertical to the floor, regardless of how level the device is installed. The processor 106 is also operable to control and direct the imaging device 104 (e.g. camera) to capture an image of the floor including the projection 34 and at least two reference indicia 30. The processor can then determine a location of the device 100 with respect to the origin 36 using the projection 34 and at least two reference indicia 30.

Figure 2:
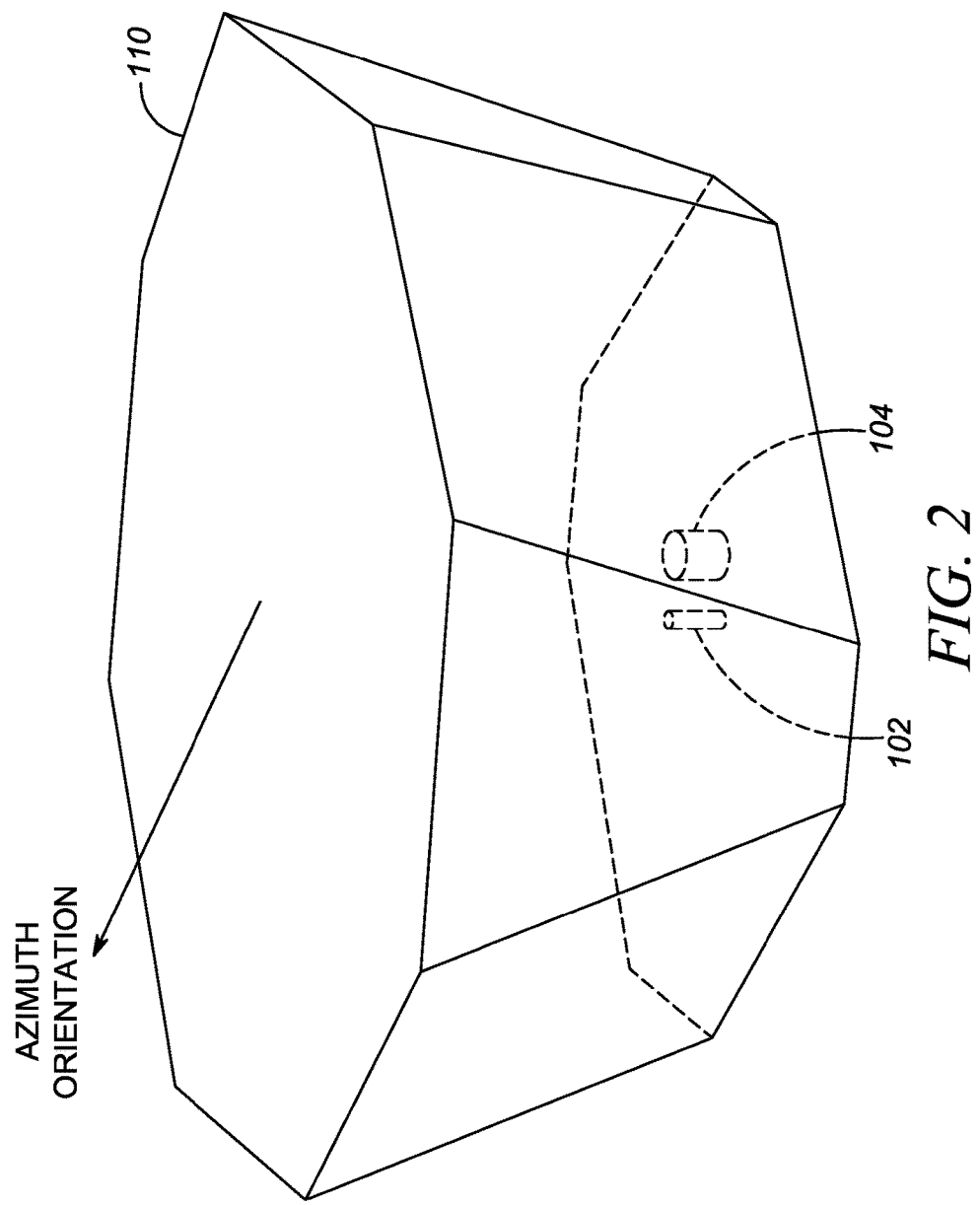
FIG. 2 is a perspective view of a housing of the device of FIG. 1.

Referring to FIG. 2, the device housing 110 can be affixed to a ceiling of the environment with a downward pointing light source 102 and imaging device 104. As disposed, the housing 110 has an azimuth orientation. In accordance with some embodiments that azimuth orientation of the device can be determined by the processor with respect to an origin of the floor plan, as will be detailed below.

Figure 3:
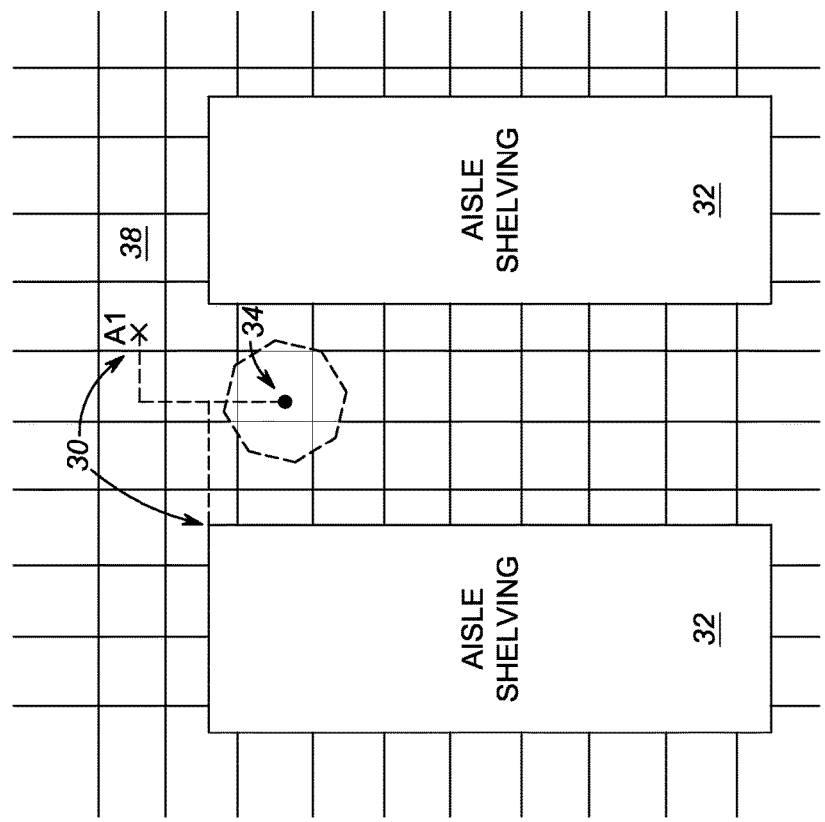
FIG. 3 is a representation of a top view of a self-locating, self-orienting device on a floor plan of the indoor environment, in accordance with one embodiment of the present invention.

Referring to FIG. 3, in one embodiment, the light source provides a projection point 34 (i.e. a laser dot) on the floor used to determine the two-dimensional (x,y) position of the device. In particular, the downward facing camera of the device will take an image of the floor space beneath it, as shown, to include the projection point 34 directly under the device and at least two fixed, recognizable reference indicia. The indicia may take many different forms as long as they are recognizable and their location is known from the floor plan. In one example, the indicia may be a unique mark on the floor, such as a mark with a unique shape or a unique identifier such as a number or letter.

In the example shown, two indicia 30 are represented, one being a distinguishing mark on the floor (labeled "A1") and the other being a corner of a shelving unit with a known position. Given the known locations of the two reference indicia with respect to the origin of the environment, the distance between the two known points can be measured in the image to provide an accurate scale indicia, and the (x,y) position of the device (associated with a vertical to the laser dot) can then be determined with respect to the indicia by simple geometry, and then by reference to the origin. In other words, the position of two known reference point provides a scale indicia and at least one known location indicia (of either point) that can be used to establish the location of the laser dot.

Alternatively, one of the reference indicia can be a recognizable point on the floor defined on the floor plan (labeled "A1"), and the other reference indicia is a direct representation of scale indicia recognizable from the floor plan, such as a floor tile 38 having a known size (e.g. one foot square). Given the known location of the one reference point with respect to the origin of the environment, and the scale given by the floor tile for example, the (x,y) position of the device (vertical from the laser dot) can then be determined with respect to the reference indicia ("A1") by simple geometry, and then by reference to the origin without undue experimentation. Optionally, a known length or width of the shelving unit 32 or other fixture can be used to provide the scale representation.

The processor is further operable to establish a height of the device above the floor. This z dimension, or height of the device above the floor can be obtained in any one of a number of ways. Firstly, if the device includes the necessary optical components and signal processing, interferometry techniques can be used to give an accurate height of the device above the floor. Secondly, if all of the devices are mounted on a common (ceiling) structure at a known height, a fixed height can be assumed for all devices. Thirdly, a manual measurement can be taken rather quickly with any standard hand held laser tape measure. Note, if the interferometry technique is used, and the laser dot falls on top of an obstruction such as a shelf or rack, the processor can detect this height that is different from a height to the floor, and either correct for it automatically if it knows the obstruction's height, or it can provide an alert to an administrator that a manual measurement is needed.

Figure 4:
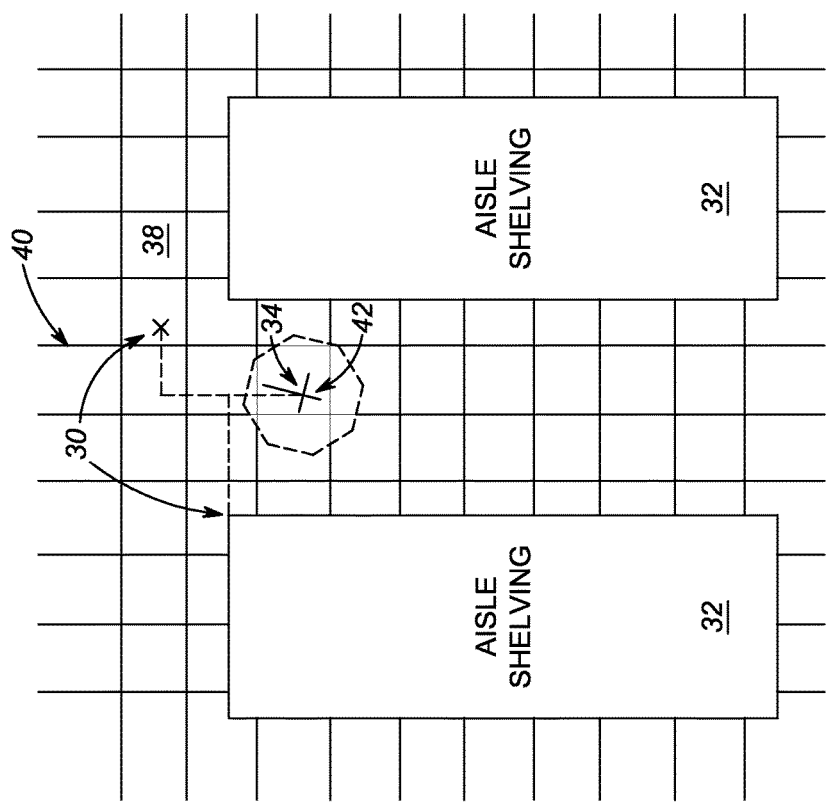
FIG. 4 is a representation of a top view of a self-locating, self-orienting device on a floor plan of the indoor environment, in accordance with another embodiment of the present invention.

Referring to FIG. 4, in another embodiment the light source projects a cross 42 on the floor directly under the device, which can be used for both accurate locationing as well as orientation. The cross has (preferably orthogonal) lines, of the same or different lengths, intersecting at a projection point 34, which is used to determine the location in the same way as the laser dot was used in the example of FIG. 3. However, in this embodiment the orthogonal lines can have one line longer than the other, which can be associated with an azimuth orientation of the device. In this case, the processor is operable to determine the azimuth orientation of the device by measuring an angle of at least one of the cross lines (and preferably the longer orthogonal line) in the image with respect to a reference indicia line 40 in the image having a known orientation on the floor plan. In this example, the reference indicia line 40 can simply be the line between tiles, having a known orientation within the environment (e.g. running north to south and parallel to a wall of the environment). Alternatively, the reference indicia line can be an edge of a fixture or other structure having a known orientation within the environment, such as a shelf edge. To determine the angular orientation of the device the processor can measure the angle between one (and preferably the longer of the orthogonal lines) of the projected cross 42 and the known orientation of the reference indicia line 40.

A plurality of devices can be disposed to cover an entire environment, unique indicia are distributed within the environment such that each camera will have a field of view able to capture at least two distinctive reference indicia as indicated on the floor plan. In this way, a location of each device can be determined throughout the environment, no matter where it is mounted. In the above scenarios, each device could determine its own location if it has the floor plan stored in a local memory. Alternatively, the mobile device can transmit the image it captures over the communication network to the backend server so that the server can determine the location (and orientation) of the device. The location (and orientation) of the device could then be plotted on a user interface, such as a display or other graphical user interface of the backend server, to be view by the administrator, or a local interface to be viewed by the device installer or other interested party.

In any of the above embodiments, once the precise (x,y,z) location (and optionally the angular orientation) of each device is automatically determined, the backend server can modify each device's performance to optimize system performance according to the installation. If, for example, the device is a wireless communication device transceiver, and it is determined that there is a larger distance between the location of one transceiver and the next, the server can take into account the greater distance and the angular orientations to alter the output level of each device to maximize communication coverage.

Figure 5:
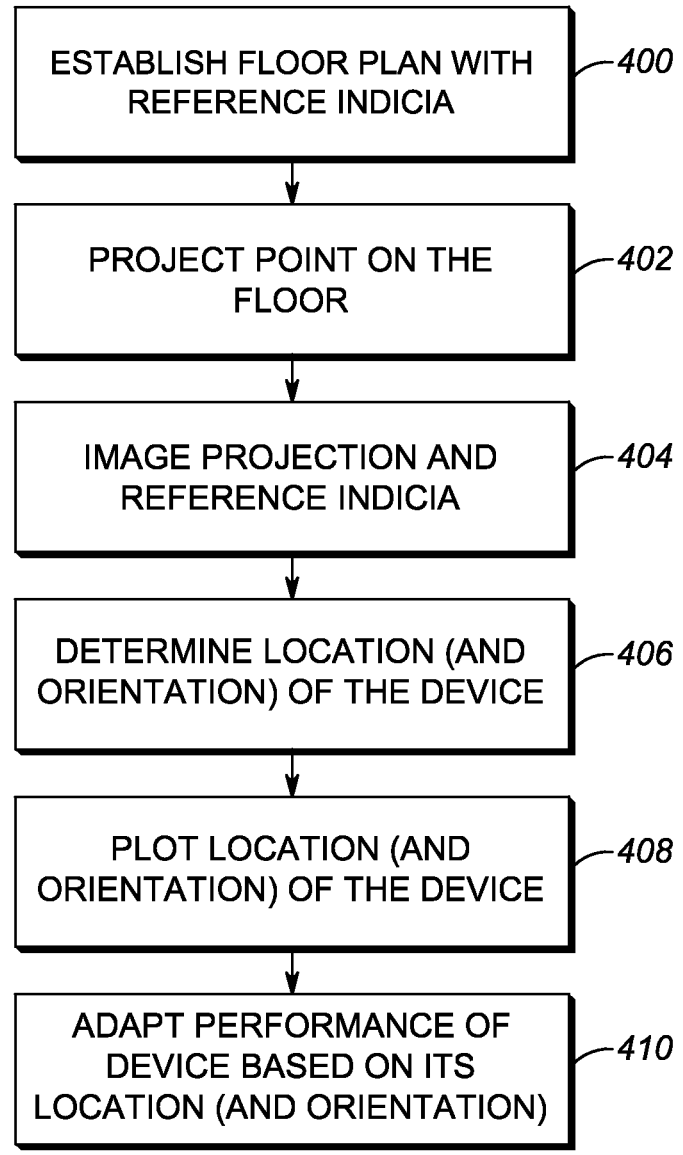
FIG. 5 is a flow diagram illustrating a method, in accordance with the present invention.

FIG. 5 is a diagram illustrating a method of self-localization of a ceiling-mounted device within an indoor environment, according to some embodiments of the present invention.

A first step 500 includes establishing a floor plan of the environment including a plurality of fixed reference indicia having known locations with respect to an origin point of the environment.

A next step 502 includes projecting a light beam downward from the device to a floor of the environment to produce a projection on the floor.

A next step 504 includes imaging the floor including the projection and at least two reference indicia.

A next step 506 includes determining a location of the device with respect to the origin using the projection and at least two reference indicia. This step can include establishing a height of the device above the floor, also.

An optional next step 508 includes plotting a location of the device on a user interface device.

In an optional next step 510 the device is a wireless communication device, and further comprising adapting a communication performance of the wireless communication device to the environment based on its location and orientation.

Advantageously, the present invention provides a technique that will greatly relieve the installation requirements of devices within an environment, saving installation time and money while improving locationing accuracy.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A ceiling-mounted device operable for self-localization and self-orientation within an indoor environment, the device comprising:
    a memory including a floor plan of the environment, the floor plan including a plurality of fixed reference indicia having known locations and orientations with respect to an origin point of the environment;
    a housing encapsulating the device and being fixedly disposed on a ceiling within the environment;
    a laser installed within the housing;
    a camera installed within the housing; and
    a processor installed within the housing and coupled to the memory, laser, and camera, the processor operable to:
        direct the laser to project a plumb light beam downward from the device to a floor of the environment to project a cross on the floor, the cross having orthogonal lines intersecting at a projection point with one line longer than the other and being aligned with an azimuth orientation of the device;
        direct the camera to capture an image of the floor with the captured image including the cross, projection point, and at least two of the plurality of fixed reference indicia, and
        determine a location and orientation of the device with respect to the origin using the projection point and the at least two of the plurality of fixed reference indicia in the captured image.

2. A method of self-localization of a fixedly ceiling-mounted device within an indoor environment, the device including a housing, the method comprising:
    storing in computer readable memory a floor plan of the environment, the floor plan including a plurality of fixed reference indicia having known locations with respect to an origin point of the environment;
    projecting, via a laser installed within the housing, a plumb light beam downward from the device to a floor of the environment to produce a cross on the floor, the cross having orthogonal lines intersecting at a projection point with one line longer than the other and being aligned with an azimuth orientation of the device;
    imaging, via a camera installed within the housing, the floor to create a captured image including the cross, projection point, and at least two of the plurality of fixed reference indicia;
    determining a location and orientation of the device with respect to the origin using the projection point and the at least two of the plurality of fixed reference indicia in the captured image.

3. The method of claim 2, wherein determining includes establishing a height of the device above the floor.

4. The method of claim 2, further comprising plotting a location of the device on a user interface device.

5. The method of claim 2, wherein the device is a wireless communication device, and further comprising adapting a communication performance of the wireless communication device to the environment based on its location and orientation.

6. The ceiling-mounted device of claim 1, wherein one of the reference indicia is a recognizable point defined on the floor plan, another of the reference indicia is scale indicia recognizable from the floor plan, and the projection provides a projection point on the floor used to determine the location.

7. The ceiling-mounted device of claim 1, wherein the reference indicia are at least two recognizable points defined on the floor plan, a distance between the recognizable points establishing a scale indicia, and the projection provides a projection point on the floor used to determine the location.

8. The ceiling-mounted device of claim 1, wherein the processor is further operable to determine the azimuth orientation of the device by measuring an angle of at least one of the orthogonal lines with respect to a reference indicia line in the image having a known orientation on the floor plan.

9. The ceiling-mounted device of claim 1, wherein the device is a wireless communication device, and wherein a communication performance of the wireless communication device is adapted to the environment based on at least its location.

10. The ceiling-mounted device of claim 1, wherein the processor is further operable to establish a first height of the device above the floor and a second height of the device above the floor, wherein if the first height and the second height are not the same, the processor provides an alert.

* * * * *